June 2, 1959 C. T. HALL 2,889,415

MULTIPLE STAGE ELECTRONIC AMPLIFIERS

Filed March 8, 1954

INVENTOR.
Cecil T. Hall.
BY
A. Williamson
HIS ATTORNEY 2,889,415
Patented June 2, 1959

2,889,415

MULTIPLE STAGE ELECTRONIC AMPLIFIERS

Cecil T. Hall, Mount Lebanon, Pa.

Application March 8, 1954, Serial No. 414,597
6 Claims. (Cl. 179—171)

Figure 1:
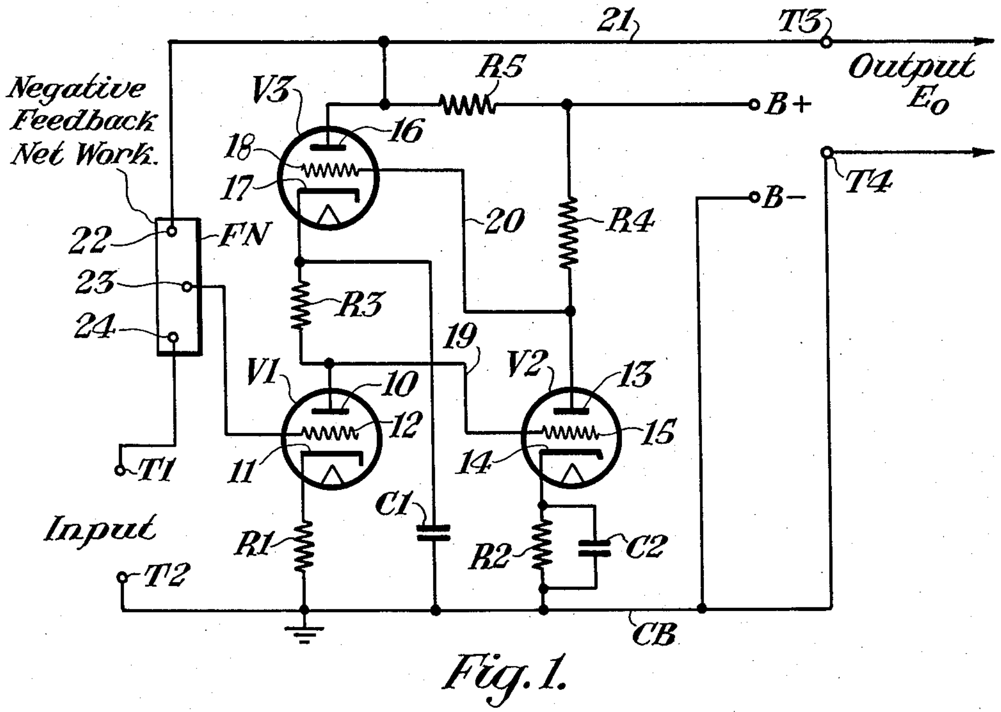

My invention relates to multiple stage electronic amplifiers, and more particularly to stable cascade direct coupled multiple stage amplifiers.

It is well known that three or more stage electronic amplifiers are highly desirable for many applications but suffer from many disadvantages, the most important being the phase shift associated with interstage coupling networks. Many designs have resulted from an effort to eliminate these networks by direct coupling each stage to its following stage. This eliminates several sources of low frequency phase shift but introduces important problems of direct current stability and exacting requirements in power supply voltages. Usually the designer resorts to expensive regulated power supplies and undesirable balancing controls and often an additional negative going power supply which may also be of the expensive regulated type. Further the electronic tubes and components may have to be selected and more expensive due to the accuracy and stability required.

These problems become more acute and new problems are added when it is desirable to employ feedback around a multiple stage amplifier. The problems are generally more complex when fixed frequency selective feedback is employed to provide a frequency selective amplifier but they reach their greatest complexity when it is desirable to provide variable frequency selection. The problem is further complicated when low level input signals and high gains are a requirement in that hum, noise and line jitters become further serious considerations.

In view of the difficult problems encountered in the provision of high gain multiple stage electronic amplifiers, an object of my invention is the provision of improved multiple stage high gain amplifiers having simplified structure.

Again, an object of my invention is the provision of multiple stage high gain amplifiers which are highly tolerant to normal power supply variations of nonregulated sources.

Another object of my invention is the provision of multiple stage high gain amplifiers in which testing and readjustments due to replaced electron tubes and other circuit elements are avoided.

Another object of my invention is the provision of direct coupled multiple stage electronic amplifiers that are free from balancing controls or adjustments.

Another object of my invention is the provision of a novel and improved three stage amplifier in which the components are reduced by causing one resistor to perform the normal functions of two resistors, one capacitor to perform the normal functions of two capacitors, and an electronic amplifier to perform the additional function of a filter impedance.

Also an object of my invention is the provision of an improved three stage amplifier wherein the cathode of the first stage amplifier may be at ground potential for low hum and noise development with direct current stabilization applied to its anode by means of the action of the second and third stage amplifiers.

Further, an object of my invention is the provision of an improved direct coupled three stage amplifier for cascade amplification of signal energy and a high order of direct current self-balancing action.

Another object of my invention is the provision of a low cost multiple stage direct coupled amplifier requiring a minimum number of standard inexpensive components for minimizing the cost of production.

A further object of my invention is the provision of improved multiple stage high gain amplifiers which are less susceptible to interlocking effects with associated amplifiers through the impedance of a common power supply.

Another object of my invention is the provision of a three or more stage electronic amplifier in which any pair of odd or even stages are connected in series for direct current flow and there is a negative feedback or degenerative action between these stages that stabilizes the direct current action.

Other objects, features and advantages of my invention will appear in the following specification taken in connection with the accompanying drawings.

My invention eliminates many drawbacks of conventional amplifiers by furnishing means for direct coupling three or more cascade amplifier stages in such a manner as to provide several highly degenerative internal direct current feedback loops which act to determine and maintain the operating conditions of the system within very narrow limits independent of variations in components and supply voltages. Further my structure permits reduction of low frequency phase shift factors to one cathode by-pass other than that factor associated with the power supply. Also it is a novel property of my structure to isolate the important first stage amplifier from this power supply phase shift factor as well as from anode voltage variations that are normally encountered in the usual unregulated line operated power supplies. Also by employing the amplifiers of two stages in series for anode to cathode current flow, advantage is taken of the characteristics of such structures of being less susceptible to filament voltage variations.

Embodiments of my invention have proven readily produceable by use of conventional components of normal tolerance and readily accommodate normal line voltage variations when employed with simple power supplies and tolerate normal variations in electron tubes. Embodiments are currently employed which permit a variable low frequency boost action by means of an inexpensive variable capacitor in a high impedance feedback network, and which are highly stable and afford extremely low hum, noise and distortion.

Briefly, my invention embodies an arrangement wherein the first and third amplifiers of a cascade three stage amplifier are in series for a common direct current flow through their internal impedances. That is, in a three stage amplifier the cathode of the third stage amplifier is connected to the anode of the first stage amplifier through an intermediate impedance. The second or intermediate stage amplifier is provided with an anode-cathode circuit independent of the series circuit of the first and third amplifiers. The second amplifier may be connected in series with a fourth stage amplifier and provide these two stages with the advantages provided for the first and third stages. Furthermore, cathode followers may be employed at any point in the system either as a means of reducing impedance or as a means of driving the cathode of a stage to avoid phase reversal in that stage.

The second stage and the third stage amplifiers have a relatively high cathode resistor or the equivalent which results in a large order of direct current and low frequency degeneration, thus maintaining the operating conditions of these stages within very narrow limits.

The cathode of the third amplifier is normally by-passed by a capacitor effective at the lowest signal frequency. The second amplifier may be similarly by-passed or the by-pass omitted when the loss in signal gain can be tolerated or it is desirable to eliminate the low frequency phase shift associated with such a by-pass capacitor.

The control electrode or grid of each of the second and third stage amplifiers is directly coupled to the anode of the preceding stage amplifier. Also the output of the amplifier is preferably coupled to the input of the amplifier through a feedback network which may have fixed or variable frequency selective characteristics.

I shall describe two forms of apparatus embodying my invention, and shall then point out the novel features thereof in claims.

Figure 2:
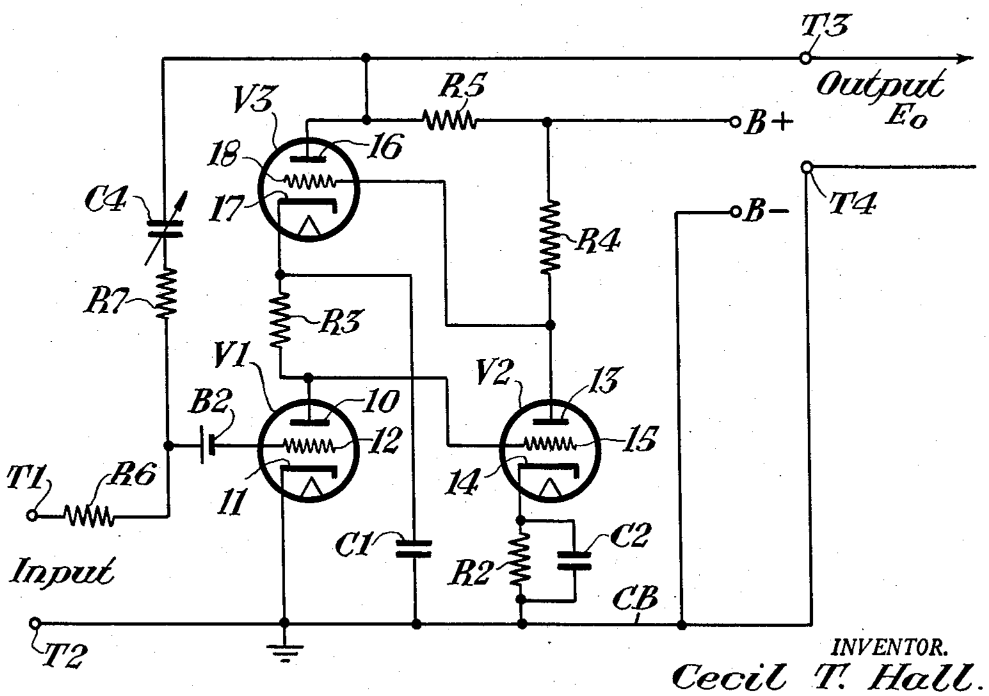

In the accompanying drawings, Figs. 1 and 2 are diagrammatic views showing a first and a second form of a three stage amplifier embodying my invention.

In each of the two views like reference characters are used to identify similar parts.

Referring to Fig. 1, the reference characters V1, V2 and V3 designate electron amplifier tubes of a first, a second and a third stage, respectively, of a three stage amplifier. These amplifier tubes are preferably indirectly heated triodes. The heater circuits are omitted from the drawing for the sake of simplicity because heater circuits are well known and are not a part of my present invention. It is understood that each of the tubes V1, V2 and V3 is in an active condition. As shown, the tube V1 is provided with an anode 10, a cathode 11 and a control electrode or grid 12. Similarly, the tube V2 is provided with an anode 13, a cathode 14 and a grid 15; and the tube V3 with an anode 16, a cathode 17 and a grid 18.

The first stage amplifier tube V1 and the third stage amplifier tube V3 have their internal anode-cathode paths in series with an intermediate impedance R3, and a suitable direct current source. The positive and negative terminals of the source are indicated at B+ and B—, and this current source may be a battery or any other source of direct current of proper voltage and output, it need not be of the voltage regulated type. The terminals only are shown for the sake of simplicity, the negative terminal B— being connected to a common grounded bus conductor CB.

Specifically, the anode-cathode circuit for tubes V1 and V3 can be traced from positive terminal B+ through resistor R5, anode 16 of tube V3, tube space to cathode 17, an intermediate impedance or resistor R3, anode 10 of tube V1, tube space to cathode 11, a cathode resistor R1 and common bus CB to negative terminal B— of the power source.

It follows that tubes V1 and V3 have a common direct current flow, the internal impedance of tube V1 and its associated impedances R1 and R3 forming a direct current cathode impedance for tube V3, and the internal impedance of tube V3 and its associated impedances forming a direct current load impedance for tube V1. Preferably the parts are proportioned for a relatively low anode voltage for the first tube V1 and a relatively high voltage for the third tube V3.

A signal by-pass circuit including a capacitor C1 is connected between cathode 17 of tube V3 and ground. The capacitor C1 is selected to pass all frequencies above the lowest desired frequency. That is, capacitor C1 blocks direct current and has a high reactance for low frequencies only. It is to be pointed out that the capacitor C1 may be replaced with a suitable voltage regulator tube and my invention contemplates the possible use of such a voltage regulator tube when a direct current amplifier is desired. This by-pass provides a dual service. First, it serves as a cathode by-pass for the third tube V3, and, second, as will appear shortly, it serves as a filter and decoupling unit for the first tube V1.

The second stage amplifier tube V2 is provided with an independent anode circuit including positive terminal B+, resistor R4, anode 13 and tube space to cathode 14, a resistor R2 and a capacitor C2 in multiple, common bus CB and negative terminal B— of the power source. The capacitor C2 is selected to pass all frequencies above a given low frequency determined by the signal range desired. Also the resistor R2 is of a relatively high resistance much higher than conventionally used, to make cathode 14 of a suitable potential with respect to ground.

The control grid 15 of the second amplifier V2 is directly connected to anode 10 of the preceding first amplifier V1 by a conductor 19. Also the control grid 18 of the third amplifier V3 is directly connected to the anode 13 of the second amplifier V2 by conductor 20. Either or both of these direct connections may be made a suitable phase shift network when required.

The control grid 12 and cathode 11 of amplifier V1 are connected by an input circuit across a pair of terminals T1 and T2, adapted to be connected to a source of signal energy. This input circuit includes resistor R1 and a portion of a feedback network FN to be more fully explained shortly. The signal energy source is not shown and it may be any suitable source such as a phonograph pickup, the energy of which it is desired to amplify. In some applications the network FN may be omitted and control grid 12 of the tube V1 connected directly to terminal T1.

The anode circuit of the third amplifier V3 is connected to a pair of output terminals T3 and T4 which are adapted to be connected to an output circuit indicated conventionally at E*o*, output terminal T4 being connected to the grounded common bus CB and the other terminal T3 being connected to anode 16 of tube V3 by wire 21. The output circuit E*o* may include, for example, the input of a power amplifier or a suitable control means.

The amplifier of Fig. 1 is provided with an overall feedback, the output being coupled to the input circuit through a three terminal feedback network shown conventionally by a rectangle FN. One terminal 22 of the network FN is connected to wire 21 of the output of tube V3, a second terminal 23 is connected to control grid 12 of tube V1, and a third terminal 24 is connected to input terminal T1. This feedback network FN may be any one of several known forms of feedback arrangements of capacitors, inductors and resistors, adjustable to pass a selected band of frequencies. The network FN is shown conventionally because any one of the several known arrangements can be used and its specific arrangement is not a part of my invention.

In the operation of the amplifier of Fig. 1, it is apparent that input signal energy applied to terminals T1 and T2 is in turn applied to control electrode 12 and cathode 11 of the first stage amplifier V1 and amplified at a gain determined by the first stage. The signal energy component at the output of tube V1 is applied by the direct coupling 19 to the control electrode 15 of the second amplifier V2 and further amplified by the second stage. Again the signal output of tube V2 is applied to control electrode 18 of tube V3 by the direct coupling 20 and further amplified by the third stage. The signal output of the third stage is then applied to terminal T3 and T4 and in turn to the output circuit E*o*. The gain effected for the signal is high and can be easily of the order of many thousand. Thus the three stages are directly coupled in cascade for high overall amplification of the signal energy.

In the amplifier of Fig. 1, the series arrangement of the first and third amplifiers V3 and V1 affords a reduction in plate or anode current requirements. Also it simplifies the amplifier in that less circuit elements are needed because the internal impedance of the tube V1 is part of the cathode resistor of tube V3, and the internal impedance of tube V3 is part of the direct current load resistance of tube V1. Also the intermediate resistor R3 serves as cathode resistance for tube V3 and as load resistance for tube V1. Again this series arrangement enables a relatively low voltage to be applied to the first amplifier V1 and a higher voltage to be applied to the third amplifier V3. With equal direct current flowing in these two amplifiers any change in the anode voltage source or in the heater voltage source results in similar effects on the two amplifiers tending to maintain the amplifier at more nearly the same operating condition. Another beneficial feature of the series arrangement is that the anode of the first amplifier V1 is not connected directly to the power source but is isolated by the third amplifier V3. This results in greatly reducing the tendency of the amplifier to interlock with other amplifiers connected to the source and thus becoming unstable. It is well known that, when more than one amplifier is supplied from a common source, the principal point of developing instability of an amplifier is at the point of highest gain which is usually at the first stage. Thus with the anode of first stage amplifier V1 isolated from the power source by the third stage amplifier V3 the stability of the amplifier is greatly improved.

The by-pass capacitors C1 and C2 are proportioned to by-pass frequencies above a selected low frequency. As previously pointed out, either or both may have a voltage regulator tube substituted for them and capacitor C2 may be eliminated with a loss of signal gain but with the advantage of eliminating a low frequency phase shift factor.

With the by-pass capacitor C1 thus proportioned, the resistor R3 plus the internal impedance of tube V1 and the resistor R1 form a cathode resistor for the third tube V3 which maintains cathode 17 of tube V3 at a suitable potential above ground. Also the cathode resistor R2 maintains the cathode 14 of tube V2 at a suitable high potential above ground.

That is, the cathode resistors for amplifier tubes V2 and V3 are much higher than conventional cathode resistors. This arrangement results in improved stability due to small current changes causing large voltage changes at the cathode.

The arrangement of the amplifier of Fig. 1 affords high stability due to its self-balancing effected through degenerative action for direct current and low frequencies. For example, for signal or noise energy below the designated range passed by capacitor C1 there is developed a voltage at the junction terminal of cathode 17 and resistor R3 which is degenerative to tube V3. There is also developed a voltage at anode 10 which is degenerative to tube V1. Further, there is developed across the cathode resistor R1 a voltage which increases the degenerative action to tube V1. Since the same voltage at the anode 10 of tube V1 is applied to grid 15 of tube V2, there is degeneration to tube V2. Again, the voltage outside the range passed by capacitor C2 developed across the high cathode resistor R2 increases the degeneration to tube V2.

For direct current consideration where by-pass capacitors C1 and C2 are inoperative, the degenerative feedback action on each stage is of a high order and rigidly maintains selected operating points of the amplifier.

To sum up, the arrangement of Fig. 1 affords high stability and uniform overall gain due to the several negative feedback or degenerative actions effected. Because of this self-balancing action the amplifier adjusts itself to the variations that may result when a tube or other circuit element is replaced, and also to variations caused by voltage changes of the power source. Because of this self-balancing action, testing and selection, when a tube or circuit element is replaced, are avoided.

In addition, this self-balancing action permits a large tolerance in the circuit elements and commercial products can be used without the need of testing and selection of each element.

Considering the action which may be effected by the feedback network FN, the impedances of which are preselected to a given gain characteristic and for complete stability for the amplifier. A high order of negative feedback may be employed while still realizing a desired overall gain because of the high gain effected by the three stages before feedback. Hence the overall feedback network FN results in almost complete elimination of hum and noise as well as effecting an almost complete gain stability.

It is apparent from the foregoing description of the operating characteristics of the amplifier of Fig. 1 that there is provided a direct coupled three stage amplifier of high gain with almost complete stability. Also, the self-balancing and degenerative action rigidly maintain selected operating points. Thus testing and readjustments are avoided when a tube or circuit element is replaced. Large tolerance in components can be permitted and components as available in normal supply can be used without special testing and selection. Furthermore, the amplifier is simple and economical in construction and the necessary stability maintained in production models.

The arrangement of the three stage amplifier disclosed in Fig. 2 is similar to that of Fig. 1. In Fig. 2 the biasing cathode resistor R1 for the first stage amplifier V1 is omitted and a biasing cell B2 is inserted in the input circuit adjacent the control grid 12 of tube V1, the cell B2 being poled to bias the grid 12 negative in potential with respect to cathode. Also the feedback network includes a capacitor C4 and resistors R6 and R7. This network is arranged for resistor R6 to be disposed between biasing cell B2 and terminal T1 and capacitor C4 and resistor R7 in series to be connected between anode 16 of tube V3 and a point intermediate resistor R6 and cell B2. As shown, the capacitor C4 is variable and the network is adjustable to pass a desired band of signal energy frequencies with a desired bass boost action.

It is clear from an inspection of the drawing that the arrangement of Fig. 2 has substantially the same operating characteristics obtained in the arrangement of Fig. 1, and the description of the operation need not be repeated except for the overall feedback.

A special application for an amplifier of the form embodying my invention would be in the preamplification of a low level audio signal to a level suitable for the input of a power amplifier driving a loud-speaker. In such a preamplifier it is desirable to incorporate a bass boost action, that is, an increased gain for the low frequencies of the signal. For example, the gain afforded by the amplifier for the low frequencies, when the average gain at mid-frequencies is of the order of 100, may be of the order of 2000 or more. The components of the feedback network of Fig. 2 are preselected to provide this bass boost action, the manner of preselecting the parts of a feedback network to attain a bass boost action being well known to the art.

For bass boost action, the amplifier of Fig. 2 is capable of large orders of such action and the bass boost may be variable as to range because there are essentially only two points at which low frequency phase shift may develop, namely, capacitors C1 and C2.

It is well known that two reactive circuits in an amplifier will cause the phase shift to approach but never reach 180 degrees. Thus, the amplifier of Fig. 2 will be stable for almost any degree of bass boost of the feedback network. I have found in practicing the invention that the arrangement disclosed in Fig. 2 gives lower hum and noise than that of Fig. 1. Although it lacks the stabilizing action provided by cathode resistor R1, the other actions of the arrangement have sufficient control to afford a very practical low level variable frequency selective feedback amplifier. In fact the form shown in Fig. 2 is that used in production of a preamplifier for moving coil and variable reluctance phonograph pickup.

It is to be understood that, while electron tubes have been disclosed as the preferred electronic amplifying device, other electron devices, such as the transistor, may be used as amplifiers in place of triodes. Also electron tubes other than triodes can be used.

It is common practice in high gain multiple stage amplifiers, particularly those incorporating overall feedback, to add a cathode follower stage which serves to isolate the load impedance. Also it serves as a low impedance source for the feedback loop as well as possessing advantages in reducing interlocking effects of the power supply. While a cathode follower stage can be used with either Fig. 1 or 2, I have found the added complexity and expense of a cathode follower is not required in that the structure of my invention is highly tolerant of variable loads. Also the isolation of the first stage from interlocking effects through the impedance of the power supply is important. It may be said that my structure substitutes a controlled degenerative action to the first stage, in relation to the other stages for effects of power supply impedance and voltage variations, for the random effects generally existing in conventional amplifiers which may be and often are regenerative and unstable in this respect.

It follows from the foregoing description that the structure of amplifiers embodying my invention has the advantages of high gain with almost complete stability. It reduces the plate or anode current requirements, and reduces the parts required by eliminating a resistor and a capacitor. Also, the added function of the amplifier V3 as a filter impedance eliminates such a filter. The series arrangement of amplifier tubes V1 and V3 gives benefits for variations of the heater or filament current. The limitation of low frequency phase shift is reduced to one or two circuit networks. Increased direct current feedback action is obtained. Improved action due to the lower anode voltage for the first tube V1 and a high anode voltage for the third tube V3. Rigid maintenance of selected operating points avoids testing and readjustments when a tube or circuit element is replaced and enables the use of components of commercial production without testing and selection. The structure is simple and easy to manufacture. The arrangement is extremely flexible for design of amplifiers for various applications. It also permits phase shift to be adjusted by use of phase network between the different amplifier tubes. A wide range of bass boost action is tolerated.

Although I have disclosed and described but two forms of multiple stage electronic amplifiers embodying my invention, it is understood that various changes and modifications may be made therein within the scope of the appended claims without departing from the spirit and scope of my invention.

Having thus described my invention, what I claim is:

1. An electronic amplifier comprising, a first, a second and a third electronic discharge device each with a cathode, an anode and a control electrode; a first, a second and a third anode resistor; a cathode resistor, an input terminal, a common terminal, an output terminal, and a source of direct current energy with first and second terminals; said first device having its said control electrode connected to said input terminal, its said cathode coupled to said common terminal and its said anode electrically connected to said control electrode of said second device; said first anode resistor connected between said anode of said first device and said cathode of said third device, said cathode resistor connected between said cathode of said second device and said common terminal, said second anode resistor connected between said anode of said second device and said first terminal of said source of energy, said control electrode of said third device electrically connected to said anode of said second device, said third anode resistor connected between said anode of said third device and said first terminal of said source of energy, said output terminal electrically coupled to the junction of said anode of said third device and said third anode resistor, said second terminal of said source of energy connected to said common terminal, and circuit means including a voltage developing device with connection to said first device for biasing said control electrode of said first device to a predetermining operating condition.

2. Apparatus as claimed in claim 1 wherein said cathode of said third device is electrically coupled to said common terminal for signal energy through a signal energy passing device.

3. Apparatus as claimed in claim 1 wherein the said cathodes of said second and said third devices are electrically coupled to said common terminal for signal energy.

4. In a cascaded amplifier system including a source of direct current energy connected between a first terminal and a common terminal and an input, an intermediate end in an output electron discharge device each having an anode, a cathode and a control electrode and each provided with an anode load resistor; said intermediate and output devices each having its said anode resistor connected to said first terminal and a conductive path from its cathode to said common terminal, said input device having its said anode resistor connected to the cathode of said output device and a conductive connection from its cathode to said common terminal, said control electrode of said output device conductively connected to the anode of said intermediate device, said control electrode of said intermediate device conductively connected to the anode of said input device, circuit means with connections to said control electrode of said input device for biasing said input device to a predetermined operating condition, means for connecting a utilizing load to said anode of said output device, and means including a signal energy source for applying signal energy between said control electrode and cathode of said input device.

5. In a cascaded amplifier system as claimed in claim 4 wherein the cathode of said output device is coupled to said common terminal for signal energy.

6. In a cascaded amplifier system as claimed in claim 4 wherein the cathodes of said intermediate and output devices are coupled to said common terminal for signal energy.

References Cited in the file of this patent

UNITED STATES PATENTS

| | | |
|---|---|---|
| 2,438,960 | Blitz | Apr. 6, 1948 |
| 2,545,507 | Williams | Mar. 20, 1951 |
| 2,584,850 | De Mers | Feb. 5, 1952 |
| 2,638,512 | Bessey | May 12, 1953 |
| 2,658,117 | Sustein et al. | Nov. 3, 1953 |
| 2,691,101 | Casey | Oct. 5, 1954 |

OTHER REFERENCES

Text, "Vacuum Tube Amplifiers," by Valley and Wallman, Radiation Laboratory Series No. 18, McGraw-Hill publishers, 1948 page 403, Figs. 10, 11*b*.